United States Patent [19]

Linse

[11] 4,443,656
[45] Apr. 17, 1984

[54] ELECTRICAL COMPONENT MEMBER WHICH IS MOUNTED IN A HOUSING CENTERED AND ADJUSTED

[75] Inventor: Heinrich Linse, Lappersdorf, Fed. Rep. of Germany

[73] Assignee: Siemens Aktiengesellschaft, Berlin and Munich, Fed. Rep. of Germany

[21] Appl. No.: 357,657

[22] Filed: Mar. 12, 1982

[30] Foreign Application Priority Data

Mar. 31, 1981 [DE] Fed. Rep. of Germany ....... 3112906

[51] Int. Cl.³ .............................................. H05K 7/12
[52] U.S. Cl. ............................ 174/52 PE; 338/276; 361/331; 361/419
[58] Field of Search ................ 174/52 PE; 338/199, 338/226, 230, 232, 233, 276, 315, 318; 29/841, 855, 856; 361/331, 334, 357, 427–429, 392, 417, 419; 264/272.15, 272.18, 275

[56] References Cited

U.S. PATENT DOCUMENTS

| | | | |
|---|---|---|---|
| 2,990,500 | 6/1961 | Mierendorf | 361/420 |
| 3,806,766 | 4/1974 | Fanning | 174/52 PE |
| 3,838,316 | 9/1974 | Brown | 174/52 PE |
| 4,353,108 | 10/1982 | Chippel | 361/419 |

FOREIGN PATENT DOCUMENTS 1299073 5/1970 Fed. Rep. of Germany .
1146381 3/1969 United Kingdom .

OTHER PUBLICATIONS

"Siemens Bauelemente, Technische Erläuterungeng und Kenndaten Für Studierende" (Siemens Components, Technical Explanations and Characteristic Data for Students), 2nd Ed., Apr. 1977, on pp. 439 to 462.

Primary Examiner—G. P. Telin
Attorney, Agent, or Firm—Herbert L. Lerner; Laurence A. Greenberg

[57] ABSTRACT

Electrical component including an electrical component member mounted centered and adjusted in a cup-shaped housing having a rectangular cross section, the housing having an opening through which lead wires from the electrical component member protrude in the same direction, and hardened sealing compound securing the electrical component member in the cup-shaped housing, the cup-shaped housing of rectangular cross section having, at least on two opposite sides thereof, integrally formed tabs consisting of the same material as that of the cup-shaped housing, the tabs being bent into the interior of the cup-shaped housing and resiliently clamping the electrical component member in the housing, the tabs being encased in the hardened sealing compound and serving as centering and adjusting means for the electrical component member.

5 Claims, 7 Drawing Figures

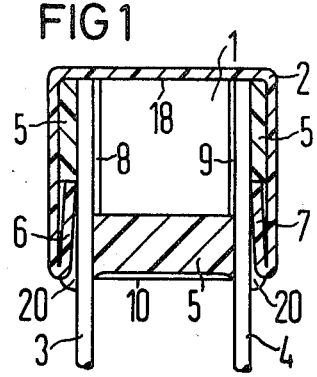
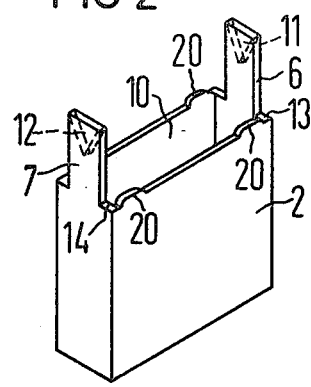
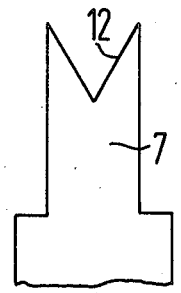
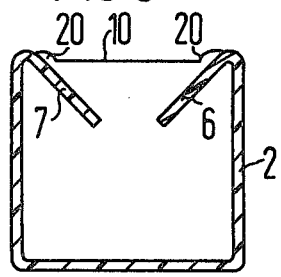
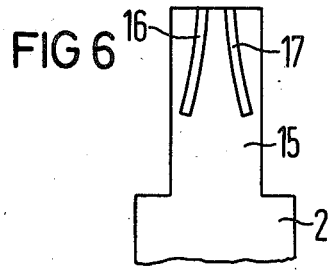
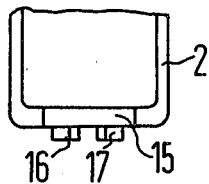
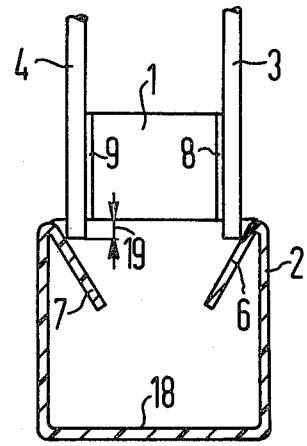

ELECTRICAL COMPONENT MEMBER WHICH IS MOUNTED IN A HOUSING CENTERED AND ADJUSTED

The invention relates to an electrical component and, more particularly, to such an electrical component which includes an electrical component member mounted centered and adjusted in a cup-shaped housing having a rectangular cross section, the housing having an opening through which lead wires from the electrical component member protrude in the same direction (axial wiring), and hardened sealing compound securing the electrical component member in the cup-shaped housing.

Such electrical components are described in the book "Siemens Bauelemente, Technische Erläuterungen und Kenndaten für Studierende". (Siemens Components, technical Explanations and Characteristic Data for Students), 2nd Ed., April 1977, on pages 439 to 462, especially on page 454, and are depicted on pages 455, 461 and 462.

In German Pat. No. 1 299 073, corresponding to British Pat. No. 1,146,381, there is described a method of installing in a cup-like housing an electric capacitor with end-face contact surfaces or a similar electrical component member provided with contact surfaces. In this method, the lead-in wires are passed through holes formed in the bottom of the cup-like housing until they protrude from the opening of the housing, after which the mechanical and electrical connection of the lead wires to the metal layers provided at the component member is effected, for example, by soldering. After the thus contacted component member is installed in the cup again, the latter is taken to a casting device wherein the empty space between the component member and the housing walls of the cup is cast full.

Electrical component members in the sense of the invention are primarily electric capacitors in the form of circular windings or of flat windings, or film capacitors (wherein the dielectrically effective layers are stacked alternatingly with metal layers ending on opposite sides), all of these capacitors being provided at opposite end faces with metal layers formed, for example, by metal spraying, to which lead wires are soldered or fastened by spot welding. These lead wires extend from the components in radial direction (axial wiring), so that these components can be accommodated in a housing in the form of a rectangular cup. Other component members are, for example, ceramic capacitors, electric resistors, coils and also semiconductor component members.

When such component members are mounted in a cup formed of insulating material, the connecting elements must be brought out radially at a defined spacing from one another (fixed grid pitch). Due to the different dimensions and the governing manufacturing tolerances of the component members, the requirement for a fixed grid pitch of the leads can be met only at very great expense, as is described, for example, in the cited German Pat. No. 1 299 073.

For protection against moisture and for securing the component member in the cup, the latter is cast full of sealing compound, for example, epoxy resins which are commercially available on a large scale, and this sealing compound is then hardened. These components members provided with leads, especially electric film capacitors, are then introduced into a preformed plastic cup which was previously filled with yet-liquid sealing compound, and is filled up with this sealing compound after the component member has been inserted. Since the sealing compound goes through a highly liquid phase during the hardening, there is danger that the electrical component member will change its position in the cup if it is not secured therein. It has become known heretofore to provide guide ribs at the inner wall of the cup for centering and adjusting the component member in the cup. Such guide ribs require, however, that the manufacturing tolerances of the electrical component member be very narrow.

Under certain conditions, clamping of the electrical component members has been realized by a special construction of the narrow side walls of the cup. Thus, for example, by a perpendicularly injection-molded guide tab in the cup at the upper edge of the narrow side walls, the guide tab having a profile providing a centering action, or by resilient lips injection-molded on and along the inner walls of the narrow side surfaces. These heretofore known securing aids, however, have the disadvantage that they are difficult to realize by injectin molding, for example, because of the ensuing removal from the mold and, in addition, only small tolerances between the length of the component member and the inner length of the cup can be compensated resiliently.

It is an object of the invention to provide an electrical component in the manufacture of which the tolerances of the dimensions thereof may be greater than heretofore; which further retains the position thereof centered and adjusted in the cup until the sealing material has hardened; and with which both the injection molding operation of the cup as well as the mounting or installation of the electrical component member in the cup can be performed in a relatively simple manner.

With the foregoing and other objects in view, there is provided in accordance with the invention, an electrical component comprising an electrical component member mounted centered and adjusted in a cup-shaped housing having a rectangular cross section, the housing having an opening through which lead wires from the electrical component member protrude in the same direction, the hardened sealing compound securing the electrical component member in the cup-shaped housing, the cup-shaped housing of rectangular cross section having, at least on two opposite sides thereof, integrally formed tabs consisting of the same material as that of the cup-shaped housing, the tabs being bent into the interior of the cup-shaped housing and resiliently clamping the electrical component member in the housing, the tabs being encased in the hardened sealing compound and serving as centering and adjusting means for the electrical component member.

In accordance with another feature of the invention the two opposite sides of the cup-shaped housing of rectangular cross section whereon the tabs are integrally formed are the narrow sides of the rectangular cross section.

The cup-shaped housing is, for all practical purposes, part of the electrical component member, because through it the electrical properties of the component member are preserved, in that influences from the environment (moisture, aggressive gases and the like) are kept away.

The specific contruction of the cup-shaped housing of the electrical component according to the invention ensures that the shortcomings and disadvantages encountered in the hereforeknown constructions are avoided and, in addition, the problem underlying the invention is solved in a satisfactory manner.

In accordance with a further feature of the invention, the tabs are formed with V-shaped cutouts into which the lead wires of the electrical component member extend. By bending such tabs into the interior of the cup-shaped housing, V-shaped forks are formed which ensure centering of the component member in direction of the width or breadth of the cup-chaped housing, while the centering of the component member in longitudinal direction of the cup-shaped housing is effected by both tabs.

It is also possible and within the scope of the invention to apply integrally formed tabs on the long sides of the rectangular housing cross section or also on all four sides of the rectangular cross section.

In accordance with an alternate feature of the invention, the tabs are formed at an outer side thereof with raised guide strips extending convergingly towards respective free ends of the tabs, the lead wires of the electrical component member extending guidingly therebetween. Also this embodiment ensures centering of the component member in direction of the width or breadth of the cup-shaped housing, besides centering in longitudinal direction of the cup-shaped housing which is effected by the bent tabs.

In accordance with a concomitant feature of the invention the cup-shaped housing has a bottom opposite the opening thereof, and the lead wires of the electrical component member extend a given distance beyond the electrical component member in direction towards the bottom of the housing so as to ensure a spacing of the electrical component member from the bottom of the cup-shaped housing.

The component member thus does not come into direct contact with the inside of the cup-shaped housing and the empty space formed can be filled completely with sealing compound.

Other features which are considered as characteristic for the invention are set forth in the appended claims.

Although the invention is illustrated and described herein as embodied in an electrical component member which is mounted in a housing centered and adjusted, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a cross-sectional view of an electrical component according to the invention;

FIG. 2 is a perspective view of a rectangular cup-shaped housing with tabs integrally formed thereon;

FIG. 3 is a sectional view of FIG. 2 showing the tabs bent inwardly;

FIG. 4 is a view of the cup-shaped housing according to FIG. 3 at the start of the insertion of the component member;

FIG. 5 is an enlarged fragmentary view of another embodiment of the tab;

FIG. 6 is a view similar to that of FIG. 5 of a further embodiment of the tab; and FIG. 7 is a view of the tab according to FIG. 6, as seen from the top of FIG. 6.

In the figures, like parts are identified by the same reference characters.

Referring now more specifically to the drawing and first, particularly, to FIG. 1 thereof, there is shown an electrical component member 1 having metal layers 8 and 9 at the end faces thereof, and further provided with lead wires 3 and 4 which are fastened to the metal layers 8 and preferably by soldering. The lead wires 3 and 4 protrude in the same direction from an opening 10 formed in the cup 2 in which the component member 1 is received. The void left between the cup 2 and the component member 1 with the lead wires 3 and 4 is filled with sealing compound 5 which is hardened. From the opening 10 and over the edge of the cup 2, tabs 6 and 7 are bent into the interior of the cup 2 and rest against the lead wires 3 and 4.

Because of the length of the tabs 6 and 7, major deviations of the component member 1 from the nominal dimension of component member length can be accommodated with certainty by bending-off the tabs 6 and 7 at different locations. Also, electrical components, preferably film capacitors of different dimensions in longitudinal direction can be inserted into cups 2 of the same dimensions. This, too, is compensated for by the inwardly-bent tabs.

In the fully inserted condition, the spring force of the tabs 6 and 7 causes the component member 1 to be secured both against floating-up and/or lateral shifting thereof in the sealing compound during hardening if the cup 2 is held, as well as against sliding-off of the cup 2 if the electrical component member 1 is held by the wires 3 and 4, i.e. by belting.

FIG. 1 shows that the component member 1 rests directly against the bottom 18 or the cup 2.

Conventional spacers 20 are provided at the cup 2 which are intended to hold the electrical component member, when assembled in a printed circuit board, at a given distance from this board.

In FIG. 2, a rectangular cup 2 is shown which is provided, in the vicinity of the opening 10 thereof with the described spacers 20. The tabs 6 and 7 are integrally formed on the narrow sides 13 and 14 of the cup 2. Such a cup is made in a relatively simple manner of insulating material by injection molding.

It is further indicated in FIG. 2 that the tabs 6 and 7 may have V-shaped cutouts 11 and 12, as is shown more clearly in FIG. 5.

FIG. 3 shows that the tabs 6 and 7 are bent away into the interior of the cup. If the tabs 6 and 7 are provided with V-shaped cutouts 11 and 12, then these cutouts form V-shaped forks with which (see FIG. 4) the lead wires 3 and 4 of the component member 1 engage, so that centering is accomplished thereby. Without such V-shaped cutouts 11 and 12, the inwardly bent tabs 6 and 7 cause the component member 1 to be centered in the direction of the longitudinal axis thereof.

In FIG. 4, wherein, so to speak, the start of the insertion operation of the component member 1 into the cup 2 is shown, there is additionally illustrated that the lead wires 3 and 4 extend beyond the component member 1 by a given length, so that a spacing 19 of the component member 1 from the bottom 18 of the cup 2 is ensured.

FIG. 5 shows the tab 7 which is integrally formed on the narrow side 14 of the cup 2 (see FIG. 2) and which is provided with a V-shaped incision 12. The purpose and manner of operation of this incision 12 was described hereinbefore.

The raised guide strips 16 and 17 shown formed on the outside of the tab 15 in FIGS. 6 and 7 act similarly. Those guide strips 16 and 17 converge in direction towards the free end of the tab, so that guidance with centering action is provided in the direction of the width or breadth of the cup 2 when this tab 15 is bent-in and, of course, also when the tab, formed in the same manner, on the opposite narrow side is bent-in. The tab 15 provided with the guide strips 16 and 17 can likewise be produced by injection molding when the cup 2 is made.

The foregoing is a description corresponding to German Application No. P 31 12 906.4, dated Mar. 31, 1981, International priority of which is being claimed for the instant application, and which is hereby made part of this application. Any discrepancies between the foregoing specification and the aforementioned corresponding German application are to be resolved in favor of the latter.

What is claimed is:

1. Electrical component comprising an electrical component member mounted centered and adjusted in a cup-shaped housing having a rectangular cross section, the housing having an opening through which lead wires from the electrical component member protrude in the same direction, and hardened sealing compound securing the electrical component member in the cup-shaped housing, the cup-shaped housing of rectangular cross section having, at least on two opposite sides thereof, integrally formed tabs consisting of the same material as that of the cup-shaped housing, said tabs being bent into the interior of the cup-shaped housing and resiliently clamping the electrical component member in said housing, said tabs being encased in the hardened sealing compound and serving as centering and adjusting means for said electrical component member.

2. Electrical component according to claim 1, wherein said two opposite sides of the cup-shaped housing of rectangular cross section whereon said tabs are integrally formed are the narrow sides of the rectangular cross section.

3. Electrical component according to claim 1, wherein said tabs are formed with V-shaped cutouts into which said lead wires of said electrical component member extend.

4. Electrical component according to claim 1, wherein said tabs are formed at an outer side thereof with raised guide strips extending convergingly towards respective free ends of said tabs, said lead wires of said electrical component member extending guidingly therebetween.

5. Electrical component according to claims 1, 2, 3 or 4, wherein the cup-shaped housing has a bottom opposite said opening thereof, and said lead wires of said electrical component member extend a given distance beyond said electrical component member in direction towards said bottom of said housing so as to ensure a spacing of said electrical component member from said bottom of said cup-shaped housing.

* * * * *